(12) United States Patent
Keithley

(10) Patent No.: US 7,782,326 B2
(45) Date of Patent: Aug. 24, 2010

(54) PARALLEL VIDEO PROCESSING ARCHITECTURE

(75) Inventor: Douglas Gene Keithley, Boise, ID (US)

(73) Assignee: Marvell International Technology Ltd., Hamilton (BM)

( * ) Notice: Subject to any disclaimer, the term of this patent is extended or adjusted under 35 U.S.C. 154(b) by 1818 days.

(21) Appl. No.: 10/788,074

(22) Filed: Feb. 25, 2004

(65) Prior Publication Data

US 2005/0185221 A1  Aug. 25, 2005

(51) Int. Cl.
*G06F 15/80* (2006.01)
(52) U.S. Cl. ...................................... 345/505
(58) Field of Classification Search ........................ None
See application file for complete search history.

(56) References Cited

U.S. PATENT DOCUMENTS 5,943,504 A * 8/1999 Flurry et al. .................. 710/22
5,982,459 A * 11/1999 Fandrianto et al. ......... 348/425.3
7,277,099 B2 * 10/2007 Valmiki et al. .............. 345/589

FOREIGN PATENT DOCUMENTS

DE  10 2004 031 73 A1  5/2005
EP  0 705 026 A1  9/1995

* cited by examiner

*Primary Examiner*—David K Moore
*Assistant Examiner*—Marcus T Riley

(57) ABSTRACT

The video data is parallel processed allowing for extremely fast video processing or a greatly reduced clock requirement for the video processing circuit. In operation, each video channel reads from main memory. This allows each video channel to track the laser directly. The Parallel video processor receives non-columnar pixel data, such as rows. The videoprocessor may support printers of any width without significantly increasing the size of the system.

15 Claims, 4 Drawing Sheets

PARALLEL VIDEO PROCESSING ARCHITECTURE

BACKGROUND

In a laser printer, printing is achieved by first scanning a digitized image onto a photoconductor. Typically, the scanning is performed with diodes, e.g. laser diodes or light emitting diodes that pulse a beam of energy onto the photoconductor. The photoconductor typically comprises a movable surface coated with a photoconductive material capable of retaining localized electrical charges. The surface of the photoconductor is divided into small units called pixels. Each pixel is capable of being charged to a given electrical potential, independent of the electrical charge of each surrounding pixel.

In operation, the pixels are first charged to a base electrical charge as they move past a charging unit during each revolution of the photoconductor. Then, as the pixels move past the diodes, the beam of energy, e.g. a laser, is pulsed to provide additional electrical charge to selected pixels. The unaltered and altered pixels thus form an image on the photoconductor. One portion of pixels will attract toner, while the other portion will not based on various factors such as the electrical potential of the toner.

Next, the toner is transferred to a finished product medium, e.g. paper, transparency, fabric. After the toner is transferred to the finished product medium, the toner is affixed thereto. Any residual toner on the equipment is then removed by a cleaning station.

The digitized image is essentially organized into a two dimensional matrix within a raster. The image is digitized into a number of lines. Each line comprises a number of discrete points. Each of the points corresponds to a pixel on the photoconductor. Each point is assigned a binary value relating information pertaining to its color and potentially other attributes, such as density. The matrix of points makes up the resultant digitally stored image. The digital image is stored in computer readable memory as a raster image. Video blocks or scan control circuitry read the raster image data and actuates the laser to selectively expose a given pixel based on the presence or absence of coloration, and the degree of coloration for the pixel.

For a four-color laser printer, at least one laser scanner is included in the printer and used to generate a latent electrostatic image on the photoconductor. Generally, one latent electrostatic image is generated for each color plane, e.g. cyan, yellow, magenta, and black, to be printed.

Current video blocks are designed for one type of printer. Thus, a video block designed for a single beam inline printer is not applied to a dual beam video laser printer. While a dual beam video block can be used in a single beam application, the silicon real estate is wasted. Each laser printer video blocks deal with a single pixel at a time. The video hardware sequentially processes the pixels, e.g. one pixel output per clock. This limits the video-processing rate or requires a higher speed clock to produced the desired pixel rate.

FIG. 1 discloses the video processing path in a prior art printer. The direct memory access (DMA) reads in the pixel data from main memory via the System Bus. This pixel data is stored in a large Multi-Line Buffer, so that the data does not have to be read in multiple times. The Serial Video Processor must have data from the rows above and below it for each line processed, e.g. a column. To make this buffer as small as possible, the buffer is shared between the two video channels: the additional video channel only increases the buffer size by a single line.

Since the Multi-line buffer holds a column of pixels, the buffer must be as wide as the longest possible scan line, e.g. page width. For an 8.5" wide (portrait orientation) 600 pixel per inch system, the buffer needs to be 5100 pixels wide. If another printer can print on 11" wide (landscape orientation) 1200 ppi printer, the buffer must be 13,200 pixels wide. The ASIC is designed with this buffer in hardware, so the largest printer supported will dictate the size of this buffer. Alternatively, the buffer dictates the maximum size/resolution of a printer.

The Serial Video Processor takes in the data in a 5×5 window of pixels and outputs a single PCODE to represent the center pixel in the window. To generate the next pixel, the window slides over one pixel and presents a new 5×5 window to the serial processor. PCODEs are special codes that contain both Pulse width information (fraction of a full pixel) and justification information (left, right center, split).

Because the two video channels share the buffer, they require that the serial video processors work on the same column. The actual printer's lasers are not working on the same column so the output of one of the serial video processors must be delayed to align with the actual hardware. This is done with another buffer, the PCODE Delay FIFO. This buffer must be large enough to span the separation in columns that exist in the actual hardware. An example size would cover 128 pixels (128×8 bit memory buffer).

SUMMARY

The video data is parallel processed allowing for extremely fast video processing or a greatly reduced clock requirement for the video processing circuit.

In operation, each video channel reads from main memory. This allows each video channel to track the laser directly. This eliminates the need for a Delay FIFO, used in the prior art, to get the data to follow the laser's actual position.

The Parallel video processor does not take in data from adjacent lines, e.g. column, so no Multi-Line buffer is needed. The video supports printers of any width without significantly increasing the size of the system. In the present embodiment, the width is limited by the size of the counter tracking width.

The data presented to the Parallel video processor is 8 adjacent pixels on a single line, e.g. row. This is the natural way they are stored in memory (linearly adjacent) and is the same memory order as used by the prior art. The processor generates 4 VCODEs at a time (in a single clock) and passes them on to the VSG block.

VCODEs are unique tokens that identify a wave shape to be used for a pixel. A VCODE can indicate a unique pulse train for the pixel period, or two pulses at programmable locations.

The entire video path (DMA, video processor and VSG) can take up less space than just the Multi-line buffer of the prior art.

DETAILED DESCRIPTION

Figure 1:
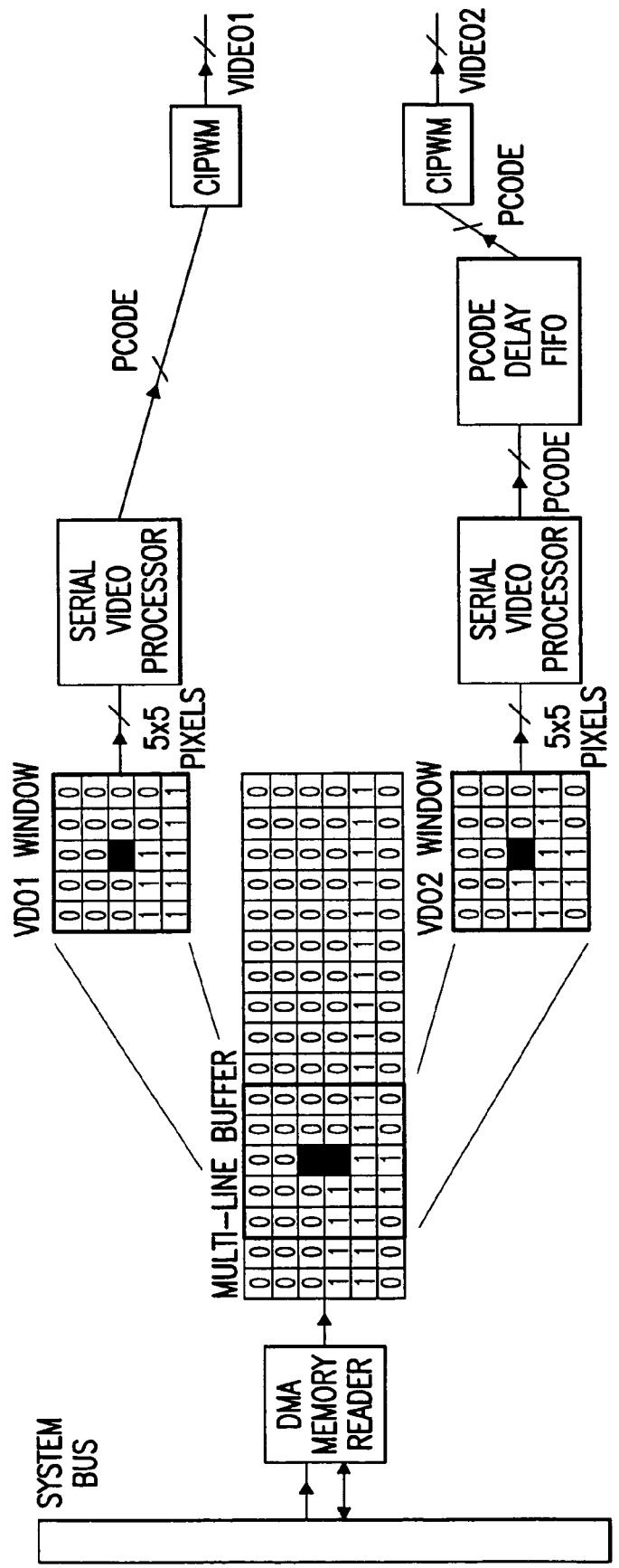
FIG. 1 illustrates a video processing path for a prior art printer.
Figure 2:
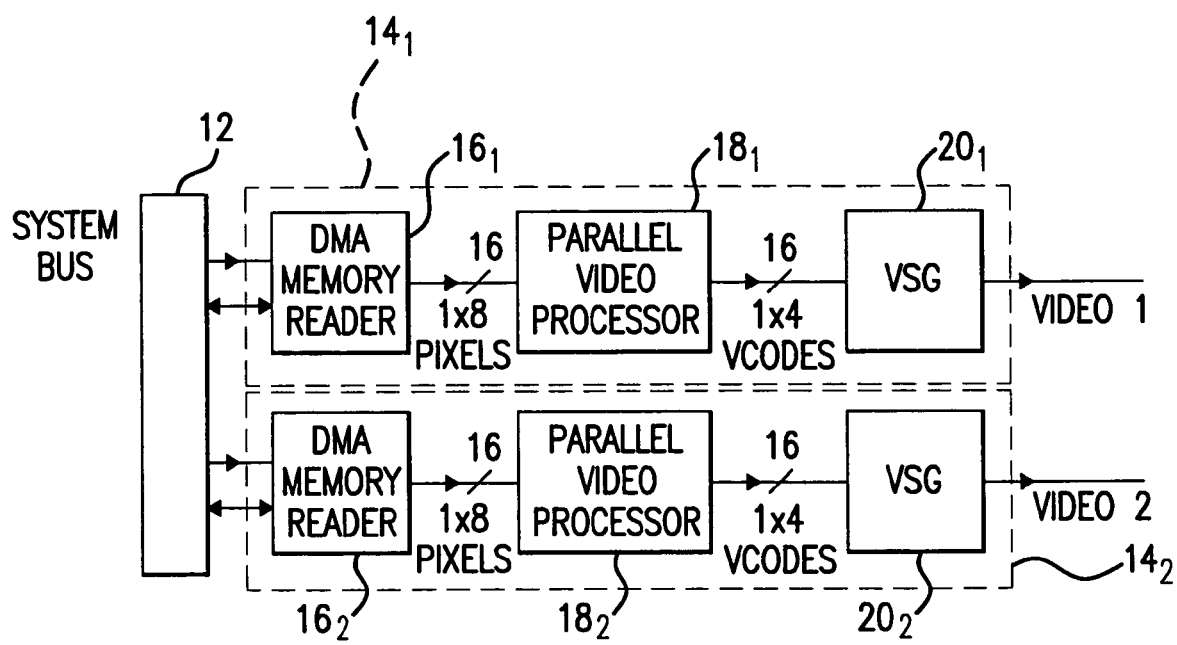
FIG. 2 illustrates a parallel video processing path according to the present invention.

FIG. 2 illustrates a parallel video processing path according to the present invention. In this example, four 4-bit output VCODEs are simultaneously generated during a single clock period.

A System Bus 12 is connected to two processing blocks $14_1$, $14_2$. Each processing block $14_x$ includes a Direct Memory Access (DMA) memory 16 bidirectionally connected to the system 12. A parallel videoprocessor $18_x$ receives eight adjacent pixels in parallel in a single line. This corresponds to the manner that they are stored in memory (linearly adjacent). The parallel videoprocessor $18_x$ generates four VCODEs at a time (in a single clock) and sends them on to a video signal generator $20_x$.

VCODEs are unique tokens that identify a wave shape to be used for a pixel. A VCODE can indicate a unique pulse train for the pixel period, or two pulses at programmable locations.

In operation, each channel reads from main memory. Since each video channel can track the laser directly, a Delay FIFO to get the data to follow the laser's actual position is not required. Since the Parallel video processor $16x$ does not receive data from adjacent lines, the Multi-Line buffer used in the prior art is unnecessary. The video supports printers of any width without significantly increasing the size of the system. The width is limited by the size of the counter that tracks width. Thus, the entire video path (DMA, video processor and VSG) is more compact than that of the prior art.

The data in and out is 16 bits wide. The input pixels are 2 bits per pixel (bpp) and the output pixels are 4 bpp.

In operation, the input registers receive data from a variety of sources, e.g. Input Pixels. The multiplexors select the source based on a specific sequence of events that control the finite state machine. Data is transferred 16 bits or 8 pixels at a time.

Figure 3:
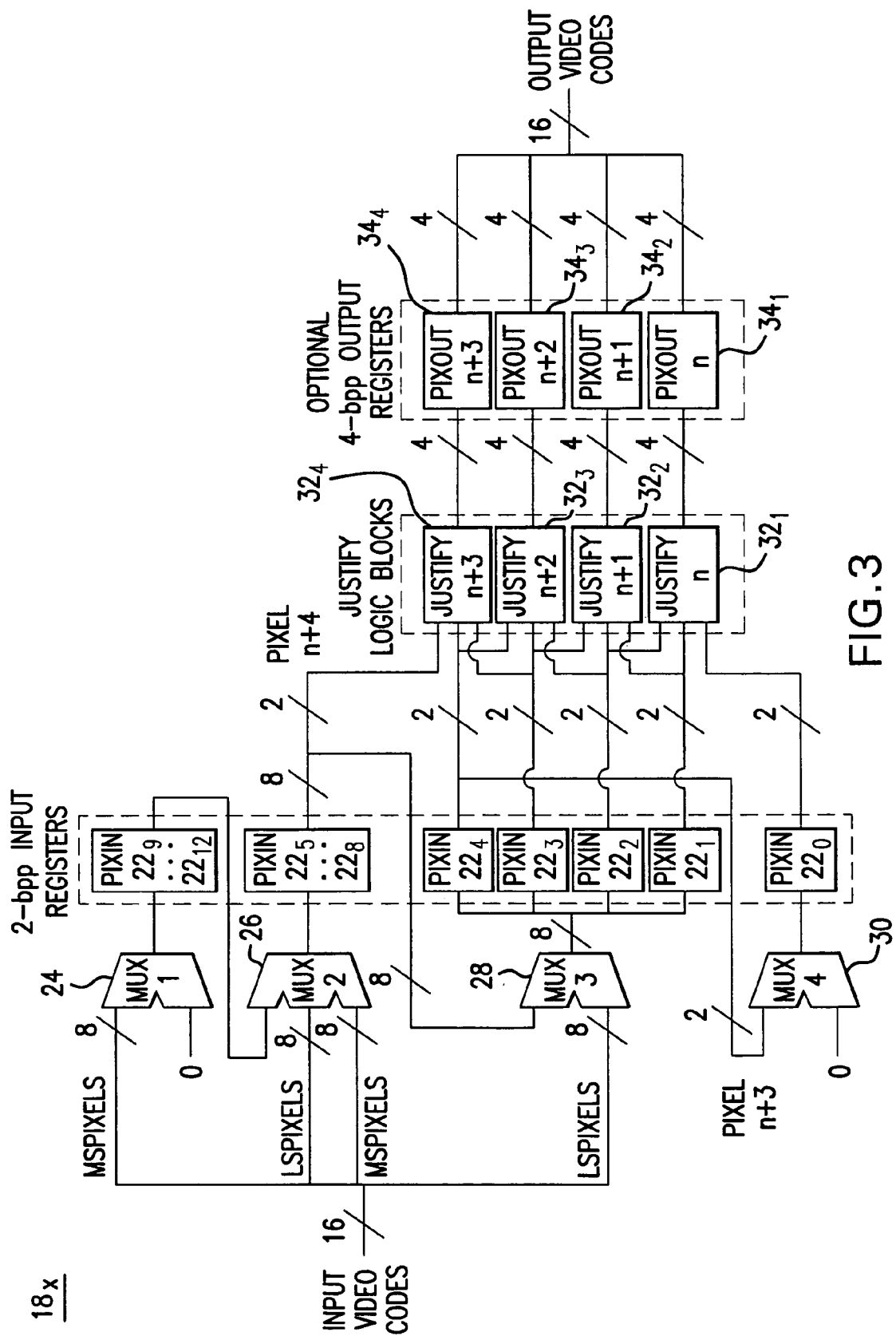
FIG. 3 illustrates a parallel processing video circuit of the present invention.

FIG. 3 illustrates the parallel videoprocessor shown in FIG. 2. While the illustrative example of the embodiment receives as an input a set of 8 2-bit input pixels and generates 4 4-bit output VCODEs, one of ordinary skill in the art can extend the inventive principles presented to generate any number of 4-bit output VCODEs.

The parallel videoprocessor $18_x$ includes a series of 3N 2 bits per pixel input registers $22_y$, where $1 \leq y \leq 3N$. In this description, N is the integer 4. A first multiplexor 24 receives an upper half of the set of input pixels and "0" and has an output connected to the top third of the series $22_9 \ldots, 22_{12}$ ($22_{2N+1} \ldots, 22_{3N}$.) A second multiplexor 26 receives the output of the top third of the series $22_9 \ldots, 22_{12}$ ($22_{2N+1} \ldots, 22_{3N}$), the upper half of the set of input pixels, and the lower half of the set of input pixels and has an output connected to the middle third of the series $22_5 \ldots, 22_8$ ($22_{N+1} \ldots, 22_{2N}$.) A third multiplexor 28 receives the lower half of the set of the input pixels and output of the middle third of the series $22_5 \ldots, 22_8$ ($22_{N+1} \ldots, 22_{2N}$) and has an output connected to the lower third of the series $22_1 \ldots, 22_4$ ($22_1 \ldots, 22_N$.) A fourth multiplexor 30 receives the top output of the lower third of the series $22_4$ ($22_N$) and a "0". The output of the fourth multiplexor 30 is connected to a register "0" $22_0$. Register "0" is a single 2 bits per pixel register.

A N logic blocks $32_m$ where each logic block m receives the outputs of the $m-1^{th}$, $m^{th}$, and $m+1^{th}$ register of the series (Pixin $22_{m-1}$, $22_m$, $22_{m+1}$). Hence, m is an integer and $1 \leq m \leq N$. Each logic block $32_m$ generates an output VCODE based on the input pixels received.

The parallel videoprocessor $18_x$ may include an optional column of N registers $34_m$. Each register $34_m$ is a 4-bit register that receives the outputs of the $m^{th}$ logic block.

In this implementation of the video, to generate the 4 bpp VCODEs, pixels on either side of the current pixel are reviewed. This results in more registers than the incoming bits. In the 4 output VCODEs embodiment, the output data width is preferably the same as the input data width. This simplifies testing and made the blocks more modular. Alternatively, the block could be omitted and the DMA could be connected to the following block since the interface is identical. Additional blocks may be added in on either side of the Parallel Video Processor block. 4 output pixels at 4 bpp is 16 bits which is the same as the input of 8 pixels at 2 bpp.

In operation, during a first clock cycle, a first set of input pixels within a row is loaded into the registers Pixin $22_1$ through Pixin $22_8$. The other Pixin registers are cleared, e.g. loaded with zeros. The output pixel functions are very fast and will be available for transfer to the next block at the next clock cycle. Only four output pixels are generated.

During the second clock cycle, the next set of input pixels within a row is loaded into the registers Pixin $22_5$ through $22_{12}$. Concurrently, the data from registers Pixin $22_4$ through $22_8$ is transferred to registers Pixin $22_0$ to Pixin $22_4$. Four output pixels are generated.

On the third clock cycle, the data in the Pixin registers is shifted down four pixels: Pixin $22_4$ to Pixin $22_{12}$ is shifted to Pixin $22_0$ to Pixin $22_8$. The upper four pixels are cleared (Pixin $22_9$ to $22_{12}$). Four more output pixels are generated.

The operations that occur during the second and third clock cyles are repeated for each set of input pixels within a row. Thus for each input of 8 pixels, two sequential sets of 4 pixels are generated.

After the last set of input pixels for the row has been processed, the data is shifted down again by four pixels on the next clock cycle: Pixin $22_4$ to Pixin $22_{12}$ is shifted to Pixin $22_0$ to Pixin $22_8$. The upper four pixels are cleared (Pixin $22_9$ to $22_{12}$). Four more output pixels are generated. This compensates for the very first set of input pixels for the row received which only generated 4 output pixels.

Figure 4:
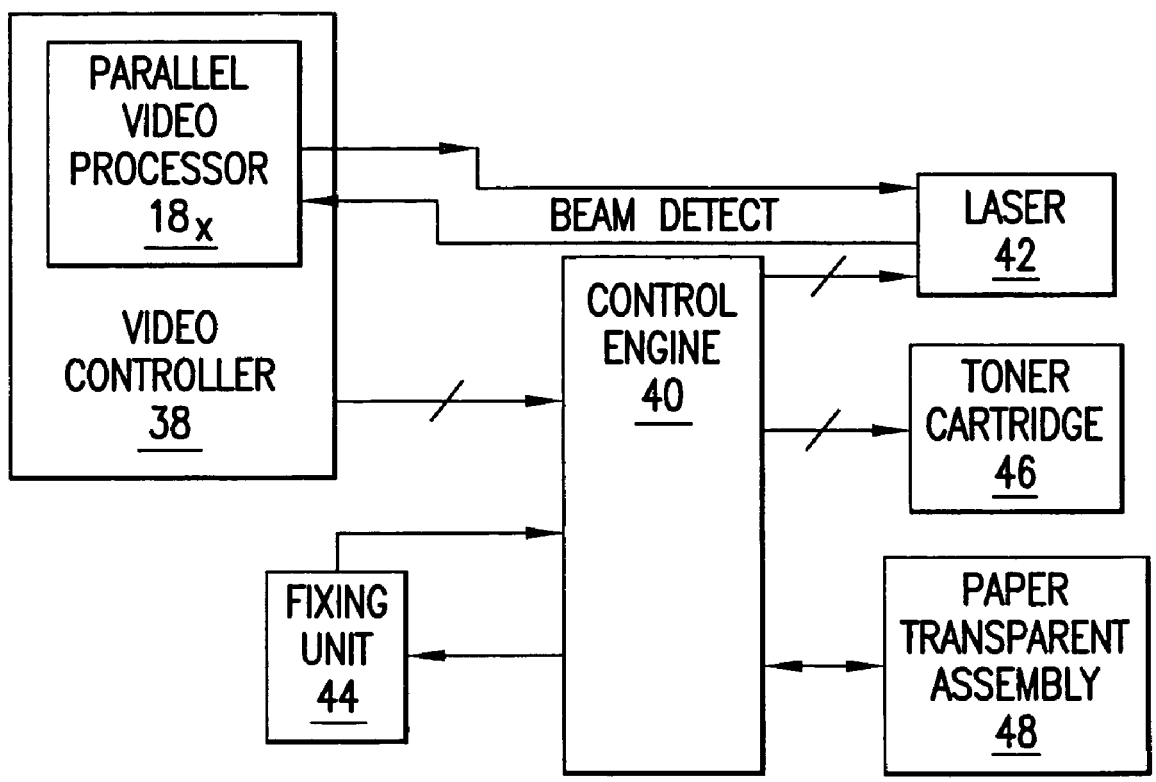
FIG. 4 illustrates a printer using the parallel processing video circuit shown in FIG. 3.

FIG. 4 illustrates a printer embodiment 36 using a parallel processing circuit of the present invention. A video controller 38, that includes at least one parallel videoprocessor $18_x$, connects to a control engine 40 and a laser 42. A fixing unit 44 bidirectionally connects to the control engine 40. The control engine 40 connects to a toner cartridge 46 and a paper transport assembly 48.

The circuit is scalable such that one of ordinary skill can extend the concept.

The invention claimed is:

1. An apparatus for videoprocessing comprising:
   a system bus; and
   at least one videoprocessing path, each videoprocessing path including:
      a DMA memory reader, configured to receive a set of input pixels corresponding to non-columnar pixel data across the system bus,
      a parallel video processor, configured to receive each one of the set of input pixels, and generate corresponding output videocodes (VCODEs), and
      a video signal generator, configured to receive the output VCODEs in parallel, and generate an image corresponding to the output VCODEs;
   wherein the parallel video processor comprises a series of 3N 2 bits per pixel input registers, wherein N is an integer, $N \geq 1$,
   wherein a lower third series of the input registers is configured to selectively receive a lower half of the set of input pixels or an output from one or more of the series of input registers,
   wherein a middle third series of the input registers is configured to selectively receive a lower half of the set of input pixels, an upper half of the set of input pixels, or an output from one or more of the series of input registers, and wherein a top third series of the input registers is configured to either receive an upper half of the set of input pixels or have the content of the top third series of the input registers cleared.

2. An apparatus for videoprocessing comprising:
a system bus; and
at least one videoprocessing path, each videoprocessing path including:
   a DMA memory reader, configured to receive a set of input pixels corresponding to non-columnar pixel data across the system bus,
   a parallel video processor, configured to receive each one of the set of input pixels, and generate corresponding output videocodes (VCODEs), and
   a video signal generator, configured to receive the output VCODEs in parallel, and generate an image corresponding to the output VCODEs,
wherein the parallel videoprocessor includes:
   a series of 3N 2 bits per pixel input registers, wherein N is an integer, N≧1;
   a first multiplexor, configured to receive an upper half of the set, having an output connected to the top third of the series;
   a second multiplexor, configured to receive the top third of the series, the upper half of the set, and the lower half of the set, having an output connected to the middle third of the series;
   a third multiplexor, configured to receive the lower half of the set and the middle third of the series, having an output connected to the lower third of the series;
   a fourth multiplexor, configured to receive the output of the series, connected to a register "0", register "0" is a single 2 bits per pixel register; and
   N logic blocks, each logic block m configured to receive the outputs of the m+1$^{th}$ and m$^{th}$ register of the series and either the (m−1)$^{th}$ register of the series or register 0, wherein m is an integer and 1≦m≦N.

3. An apparatus, as defined in claim 2, wherein the parallel videoprocessor further includes N registers, each register being a 4-bit register, wherein each register m is configured to receive the outputs of the m$^{th}$ logic block.

4. An apparatus, as defined in claim 2, wherein the set of input pixels includes 16 input pixels.

5. An apparatus, as defined in claim 2, wherein the non-columnar pixels are adjacent and in the same row.

6. An apparatus, as defined in claim 2, wherein N=4.

7. A method for videoprocessing comprising:
receiving a set of input pixels corresponding to non-columnar pixel data;
generating output videocodes (VCODEs) in parallel from the set of input pixels; and
generating an image corresponding to the output VCODEs;
wherein said generating output VCODEs comprises:
   selectively loading the received set of input pixels into a top third, a middle third, and a bottom third series of 2 bits per pixel input registers;
   selectively transferring data among the top third, the middle third, and the bottom third series of registers and a "0" register; and
   generating a plurality of output pixels based on the selectively loading and the selectively transferring.

8. A method, as defined in claim 7, wherein said generating output VCODEs further comprises:
   processing the plurality of output pixels in a plurality of 4 bits per pixel output registers; and
   generating the output VCODEs in parallel based on the processing.

9. A method for videoprocessing comprising:
receiving a set of input pixels corresponding to non-columnar pixel data;
generating output videocodes (VCODEs) in parallel from the set of input pixels; and
generating an image corresponding to the output VCODEs;
wherein generating the VCODES comprises:
   loading, during a first clock cycle, a lower half of the received set of input pixels into a lower third and a middle third of a series of 3N 2 bits per pixel input registers, thereby generating N output pixels, wherein N is an integer, N≧1; and
   clearing, during a first clock cycle, a top third of the series of input registers.

10. A method, as defined in claim 9, wherein generating the VCODES further comprises:
   loading, during a second clock cycle, an upper half of the received set of input pixels into the middle third and the top third of the series of input registers, and concurrently, transferring data from one of the lower third of the series of input registers and from the middle third of the series of input registers to a "0" register and to the lower third of the series of input registers, respectively, thereby generating N output pixels, wherein the "0" register is a single 2 bits per pixel register.

11. A method, as defined in claim 10, wherein generating the VCODES further comprises:
   transferring, during a third clock cycle, data from one of the lower third of the series of input registers and from the middle third and the top third of the series of input registers to the "0" register, the lower third, and the middle third of the series of input registers, respectively, thereby generating N output pixels, and subsequently, clearing the top third of the series of input registers.

12. A method, as defined in claim 7, wherein the set of input pixels includes 16 input pixels.

13. A method, as defined in claim 7, wherein the non-columnar pixels are adjacent and in the same row.

14. An apparatus, as defined in claim 1, wherein the parallel videoprocessor further comprises a register "0" configured to selectively receive an output from at least one of the series of the input registers.

15. An apparatus for videoprocessing comprising:
a parallel video processor, configured to receive each one of the set of input pixels, and generate corresponding output videocodes (VCODEs), the parallel video processor comprising a series of 3N 2 bits per pixel input registers, wherein N is an integer, N≧1, divided in a top third, a middle third, and a bottom third series of input registers;
wherein the parallel video processor is configured to
   selectively load the received set of input pixels into the top third, a middle third, and a bottom third series of registers, and
   selectively transfer data among the top third, the middle third and the bottom third registers and a "0" register, and generate a plurality of output pixels based on the selectively loading and the selectively transferring.

* * * * *